US011647291B2

(12) United States Patent
Kawai (10) Patent No.: US 11,647,291 B2
(45) Date of Patent: May 9, 2023

(54) IMAGE PROCESSING APPARATUS AND CONTROL METHOD OF THE SAME, ORIENTATION ADJUSTMENT SYSTEM AND NON-TRANSITORY COMPUTER-READABLE MEDIUM STORING PROGRAM

(71) Applicant: CANON KABUSHIKI KAISHA, Tokyo (JP)

(72) Inventor: Takashi Kawai, Kanagawa (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 72 days.

(21) Appl. No.: 17/168,326

(22) Filed: Feb. 5, 2021

(65) Prior Publication Data
US 2021/0281763 A1 Sep. 9, 2021

(30) Foreign Application Priority Data
Mar. 9, 2020 (JP) .............................. JP2020-039923

(51) Int. Cl.
H04N 5/232 (2006.01)
G06T 7/33 (2017.01)
G06T 7/73 (2017.01)

(52) U.S. Cl.
CPC ..... *H04N 5/23299* (2018.08); *H04N 5/23229* (2013.01); *H04N 5/23293* (2013.01)

(58) Field of Classification Search
CPC ........... H04N 5/23299; H04N 5/23229; H04N 5/23293; G06T 2207/30244; G06T 7/337; G06T 7/75; G06T 7/344; G06T 2207/20016; G06T 2207/30204
See application file for complete search history.

(56) References Cited

U.S. PATENT DOCUMENTS

| 10,685,431 B1* | 6/2020 | Geng ...................... G06T 5/006 |
| 2014/0028839 A1* | 1/2014 | Ishibashi .............. H04N 5/3572 348/242 |
| 2017/0287165 A1 | 10/2017 | Lam et al. |

FOREIGN PATENT DOCUMENTS

JP 2019-092007 A 6/2019

OTHER PUBLICATIONS

Bajura et al., Dynamic Registration Correction in Video-Based Augmented Reality Systems, IEEE Computer Graphics and Applications, Sep. 1995, vol. 15, No. 5, pp. 52-60.

(Continued)

*Primary Examiner* — Christopher K Peterson
(74) *Attorney, Agent, or Firm* — Carter, DeLuca & Farrell LLP (57) ABSTRACT

An image processing apparatus: obtains a captured image captured by the image capturing apparatus after an orientation adjustment is performed by using a first target image generated based on a three-dimensional model of a structure in an image capturing region; determines a correction amount for correcting a difference between an orientation of the image capturing apparatus and a target orientation based on the first target image and the obtained captured image; and corrects the captured image by using the correction amount. The corrected captured image can be used as a second target image for further adjusting the posture of the imaging device.

18 Claims, 10 Drawing Sheets

(56) References Cited

OTHER PUBLICATIONS

Extended European Search Report issued by the European Patent Office dated Jul. 2, 2021 in corresponding EP Patent Application No. 21154674.2.
Kawamura, T. et al., "An Augmented Reality System using Landmarks from Realtime Video Image" Proceedings of the 52nd National Convention, Information Processing Society of Japan (Mar. 6, 1996) p. 177-178.

* cited by examiner

IMAGE PROCESSING APPARATUS AND CONTROL METHOD OF THE SAME, ORIENTATION ADJUSTMENT SYSTEM AND NON-TRANSITORY COMPUTER-READABLE MEDIUM STORING PROGRAM

BACKGROUND

Field

The present disclosure relates to an image processing apparatus and a control method of the same, an orientation adjustment system, and a non transitory computer-readable medium storing a program that are for adjusting an orientation of an image capturing apparatus.

Description of the Related Art

There is a technique for adjusting an orientation of an image capturing apparatus (hereinafter, also referred to as a camera) by compositing and displaying a target image and a captured image. For example, a method of detecting and correcting an orientation change over time of a fixed camera for monitoring by compositing a past captured image and a current captured image has been known. Takahiro Kawamura, Junichi Tatemura, Masao Sakauchi, "An Augmented Reality System using Landmarks from Realtime Video Image", Proceedings of the 52nd National Convention, Information Processing Society of Japan, Mar. 6, 1996, p. 177-178 discloses a technology including extracting landmarks (specific objects) from a captured image, calculating positions on the image, and identifying a position and an orientation of a camera based on position coordinates of the landmarks calculated by computer graphics in advance. Alternatively. Japanese Patent Laid-Open No. 2019-092007 discloses a technology including determining positions and orientations of a plurality of image capturing apparatuses for capturing an image of an object from multiple view points, providing the information thereof to a user (a person who performs an installation operation), and then assisting the installation operation of the image capturing apparatus by the user or the like.

In a case of using the computer graphics to generate the position and orientation information of the image capturing apparatus, the following problems occur. That is, since the camera has optical properties (optical aberration) specific to each lens, an aplanatic computer graphics image (CG image) based on paraxial optical calculation is different from an actual captured image. For example, an image forming position in a case of distortion aberration deviates from an image forming position in the case of being aplanatic as closer to an edge on a screen. Therefore, even when the CG image and the captured image coincide with each other at the center thereof, the CG image and the captured image are misaligned at end portions of the screen, and the CG image and the captured image do not entirely coincide on the screen. Accordingly, in the camera orientation adjustment, orientation adjustment based on the subjective view of an operator is performed, which leads to a reduction in accuracy of the camera orientation adjustment, a variation due to the operator, degradation in reproducibility of the orientation adjustment, and the like.

SUMMARY

The present disclosure provides a technology for enabling orientation adjustment of an image capturing apparatus with high accuracy.

According to one aspect of the present invention, there is provided an image processing apparatus comprising: one or more memories is configured to store instructions; and one or more processors is configured to execute the instructions to: obtain a captured image captured by the image capturing apparatus after an orientation adjustment is performed by using a first target image generated based on a three-dimensional model of a structure in an image capturing region; determine a correction amount for correcting a difference between an orientation of the image capturing apparatus and a target orientation based on the first target image and the obtained captured image; and correct the captured image by using the correction amount.

According to another aspect of the present invention, there is provided an image processing method comprising: obtaining a captured image captured by the image capturing apparatus after an orientation adjustment is performed by using a first target image generated based on a three-dimensional model of a structure in an image capturing region; determining a correction amount for correcting a difference between an orientation of the image capturing apparatus and a target orientation based on the first target image and the obtained captured image; and correcting the captured image by using the correction amount.

According to another aspect of the present invention, there is provided an orientation adjustment system comprising: one or more memories is configured to store instructions; and one or more processors is configured to execute the instructions to: obtain a first target image generated based on a three-dimensional model of a structure in an image capturing region; cause a display device to display an image for adjusting an orientation of the image capturing apparatus by using the first target image; determine a correction amount for correcting a difference between the orientation of the image capturing apparatus and a target orientation based on a captured image captured by the image capturing apparatus after the orientation adjustment is performed by using the displayed image and the first target image; generate a second target image by correcting the captured image based on the correction amount; and cause a display device to display an image for further adjusting the orientation of the image capturing apparatus by using the second target image.

According to another aspect of the present invention, there is provided a non-transitory computer-readable medium storing a program for causing a computer to perform an image processing method comprising: obtaining a captured image captured by the image capturing apparatus after the orientation adjustment is performed by using a first target image generated based on a three-dimensional model of a structure in an image capturing region; determining a correction amount for correcting a difference between an orientation of the image capturing apparatus and a target orientation based on the first target image and the obtained captured image; and correcting the captured image by using the correction amount.

Further features of the present disclosure will become apparent from the following description of exemplary embodiments with reference to the attached drawings.

DESCRIPTION OF THE EMBODIMENTS

Hereinafter, embodiments will be described in detail with reference to the attached drawings. Note, the following embodiments are not intended to limit the scope of an invention. Multiple features are described in the embodiments, but limitation is not made to an invention that requires all such features, and multiple such features may be combined as appropriate. Furthermore, in the attached drawings, the same reference numerals are given to the same or similar configurations, and redundant description thereof is omitted.

First Embodiment

Figure 1:
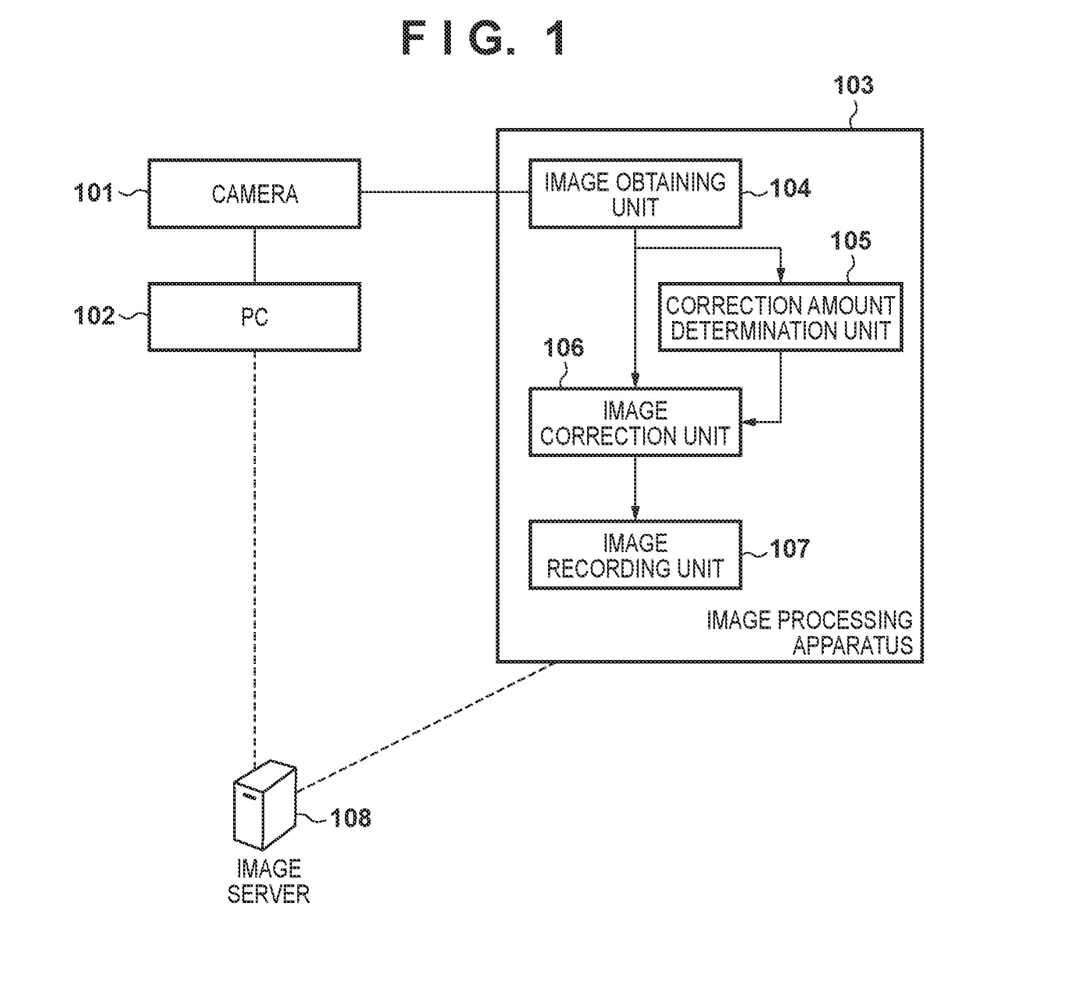
FIG. 1 is a diagram illustrating a configuration example of an orientation adjustment system according to a first embodiment.

FIG. 1 is a diagram illustrating a configuration example of an orientation adjustment system that achieves orientation adjustment of an image capturing apparatus according to a first embodiment. A camera 101 is an image capturing apparatus that is a target of the orientation adjustment according to the present embodiment. The camera 101 is adjusted in orientation so as to capture an image of a predetermined region. According to the present embodiment, two types of orientation adjustment of first camera orientation adjustment and second camera orientation adjustment are performed. Details of each type of orientation adjustment will be described later. 102 is a personal computer (hereinafter, PC 102) to which video can be input from an external device. For example, a laptop computer to which video output from the camera can be input from an HDMI® terminal or a USB terminal to display the output video on a display can be used as the PC 102. The PC 102 composites a target image for camera orientation adjustment and an actually captured image (captured image) in real time from the camera 101 during the orientation adjustment, and displays the compositing images on the display. A user performs the orientation adjustment of the camera 101 such that the two images coincide with each other while viewing the two images composited and displayed on the display.

The PC 102 composites and displays a target image (a first target image) corresponding to a region to be image-captured by the image capturing apparatus adjusted to a target orientation and a captured image in real time from the camera 101 on the display. The first target image is, for example, a computer graphics image (hereinafter, CG image) generated by computer graphics (hereinafter, CG). The user performs the camera orientation adjustment by using the compositing display of the first target image and the captured image (first camera orientation adjustment). An image processing apparatus 103 generates a target image (second target image) for second camera orientation adjustment based on a captured image obtained from the camera 101 after the first camera orientation adjustment is completed. The generated second target image is transferred to an image server 108. The PC 102 obtains the second target image from the image server 108, and composites and displays a captured image in real time that is obtained from the camera 101 and the second target image. The user performs the camera orientation adjustment by using the compositing display of the second target image and the captured image (second camera orientation adjustment).

In the image processing apparatus 103, an image obtaining unit 104 obtains a captured image from the camera 101 connected to the image processing apparatus 103. In the present embodiment, the image obtaining unit 104 obtains the captured image after the first camera orientation adjustment. A correction amount determination unit 105 determines a correction amount for correcting a difference between the orientation of the image capturing apparatus and the target orientation based on the target camera orientation and the captured image after the first camera orientation adjustment. For example, the correction amount determination unit 105 calculates a difference between the captured image obtained by the image obtaining unit 104 after the first camera orientation adjustment and the target camera orientation, and determines the calculated difference as the correction amount. This correction amount is used by an image correction unit 106 as the correction amount for the captured image after the first camera orientation adjustment. The image correction unit 106 corrects the captured image obtained by the image obtaining unit 104 based on the correction amount determined by the correction amount determination unit 105, and generates the second target image to be used for the second camera orientation adjustment. An image recording unit 107 temporarily records the second target image generated by the image correction unit 106 in order to transfer the second target image to the image server 108. The second target image transferred to the image server 108 is sent to the PC 102 for the second camera orientation adjustment.

Figure 10:
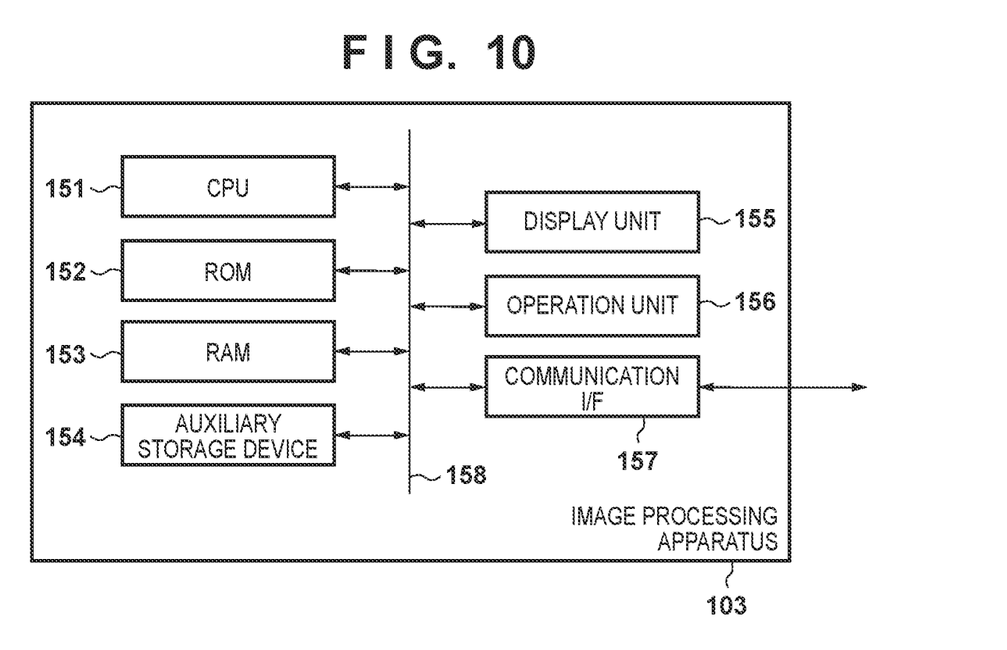
FIG. 10 is a block diagram illustrating a hardware configuration example of an image processing apparatus.

Next, a hardware configuration of the image processing apparatus 103 will be described with reference to FIG. 10. FIG. 10 is a block diagram illustrating a hardware configuration example of the image processing apparatus 103. Note that a hardware configuration of the PC 102 is similar to the configuration of the image processing apparatus 103 to be described below. That is, the image processing apparatus 103 and the PC 102 may be implemented by an information processing apparatus provided with the hardware configuration to be described below. The image processing apparatus 103 includes a CPU 151, a ROM 152, a RAM 153, an auxiliary storage device 154, a display unit 155, an operation unit 156, a communication I/F 157, and a bus 158.

The CPU 151 achieves each function of the image processing apparatus 103 illustrated in FIG. 1 by using a computer program and data stored in the ROM 152 and the RAM 153 to control the entire image processing apparatus 103. Note that the image processing apparatus 103 includes one or more pieces of dedicated hardware that is different from the CPU 151, and at least a part of processing by the CPU 151 may be performed by the dedicated hardware. Examples of the dedicated hardware include an application specific integrated circuit (ASIC), a field programmable gate array (FPGA), and a digital signal processor (DSP). The ROM 152 stores programs and the like that do not require modifications. The RAM 153 temporarily stores programs and data supplied from the auxiliary storage device 154, data externally supplied via the communication I/F 157, and the like. The auxiliary storage device 154 is configured of, for example, a hard disk drive, and the like, and stores various kinds of data such as image data, and audio data.

The display unit 155 is configured of, for example, a liquid crystal display, an LED, or the like, and displays a graphical user interface (GUI) or the like by which a user operates the image processing apparatus 103. The operation unit 156 is configured of, for example, a keyboard, a mouse, a joy stick, a touch panel, or the like, and receives a user operation to input various instructions into the CPU 151. The CPU 151 operates as a display control unit configured to control the display unit 155 and an operation control unit configured to control the operation unit 156.

The communication I/F 157 is used for communication of the image processing apparatus 103 with an external device (e.g., the camera 101, and the image server 108). For example, when the image processing apparatus 103 is connected by wire to the external device, a cable for communication is connected to the communication I/F 157. When the image processing apparatus 103 has a function of wirelessly communicating with the external device, the communication/F 157 is provided with an antenna. The bus 158 transmits information by connecting the respective units of the image processing apparatus 103.

In the present embodiment, the display unit 155 and the operation unit 156 are present inside the image processing apparatus 103, but at least one of the display unit 155 and the operation unit 156 may be present outside the image processing apparatus 103 as another device. Note that in the present embodiment, the orientation of the camera 101 is adjusted by compositing and displaying the target image and the captured image on the display unit 155 included in the PC 102. In the present embodiment, the display unit 155 included in the PC 102 is denoted as a display.

Note that in the first embodiment, a configuration has been adopted in which the second target image is delivered to the PC 102 via the image server 108, but the present disclosure is not limited thereto. For example, the PC 102 and the image processing apparatus 103 may be communicatively connected so as to directly transfer the second target image from the image processing apparatus 103 to the PC 102. For example, in a case where each of the PC 102 and the image processing apparatus 103 has a communication function such as an e-mail, the second target image may be transmitted directly from the image processing apparatus 103 to the PC 102. When the PC 102 and the image processing apparatus 103 can directly communicate with each other, the image server 108 can be omitted. Alternatively, in FIG. 1, the PC 102, the image processing apparatus 103, and the image server 108 are implemented with different information processing apparatuses from each other, but at least two of them may be implemented with one information processing apparatus. For example, the PC 102 and the image processing apparatus 103 may be integrated such that the PC 102 performs the above-described functions of the image processing apparatus 103.

Figure 2:
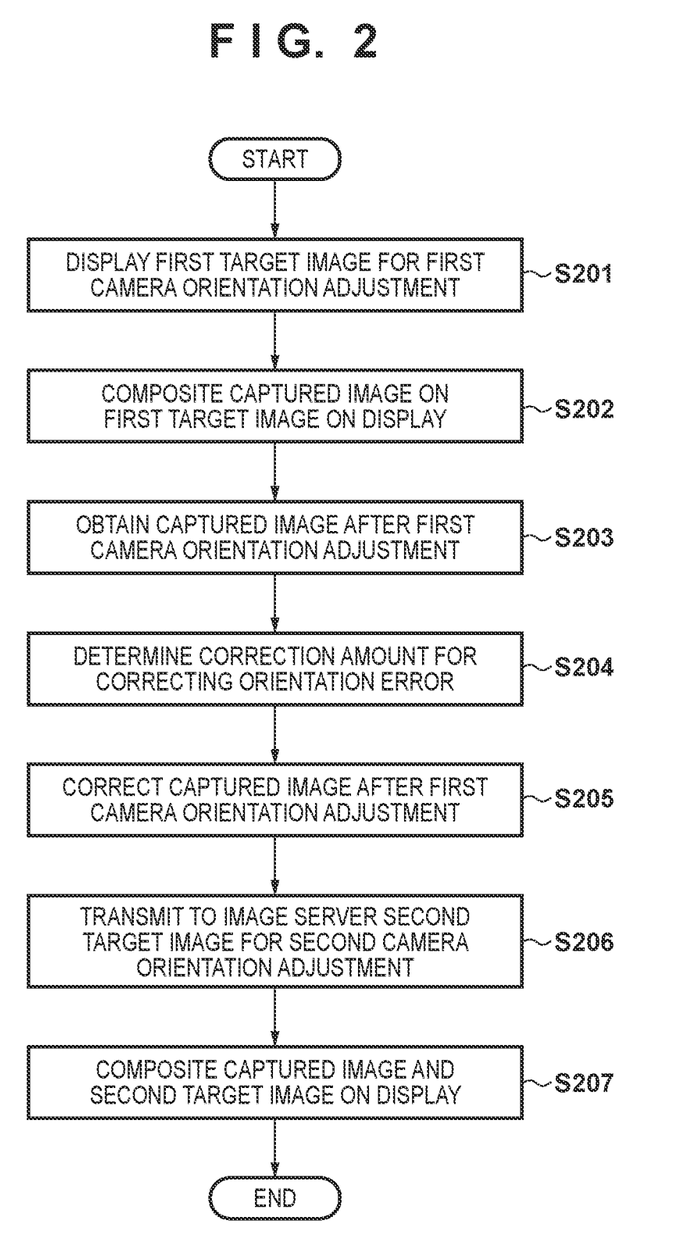
FIG. 2 is a flowchart illustrating an operation of the orientation adjustment system according to the first embodiment.

FIG. 2 is a flowchart illustrating an operation of the orientation adjustment system according to the first embodiment. An orientation adjustment method of the camera according to the first embodiment will be described below with reference to the flowchart of FIG. 2. Note that, at the start of the camera orientation adjustment, a user who is an operator of the camera orientation adjustment connects the camera 101 and the image processing apparatus 103, and connects the camera 101 and the PC 102, as illustrated in FIG. 1. For example, between the camera 101 and the image processing apparatus 103, R, G, and B color signals may be independently connected through a BNC coaxial cable. In addition, for example, the camera 101 and the PC 102 are connected through an HDMI® cable, and a captured image by the camera 101 is transmitted to the PC 102 through an HDMI® cable and is displayed on the display.

When the camera orientation adjustment starts, first in step S201, the PC 102 obtains the first target image for the first camera orientation adjustment and displays the obtained first target image on the display. The first target image is an image corresponding to a region to be image-captured by the camera 101 adjusted to the target orientation. The obtaining and displaying of the first target image are performed in response to a predetermined user operation (an operation indicating the start of the orientation adjustment) to the PC 102, for example. A generation method of the first target image will be described. In the present embodiment, the PC 102 generates the first target image in advance, as will be described below. However, this disclosure is not limited thereto, and the first target image generated in advance may be held in the image server 108, and the PC 102 may obtain the first target image from the image server 108.

Figure 3A:
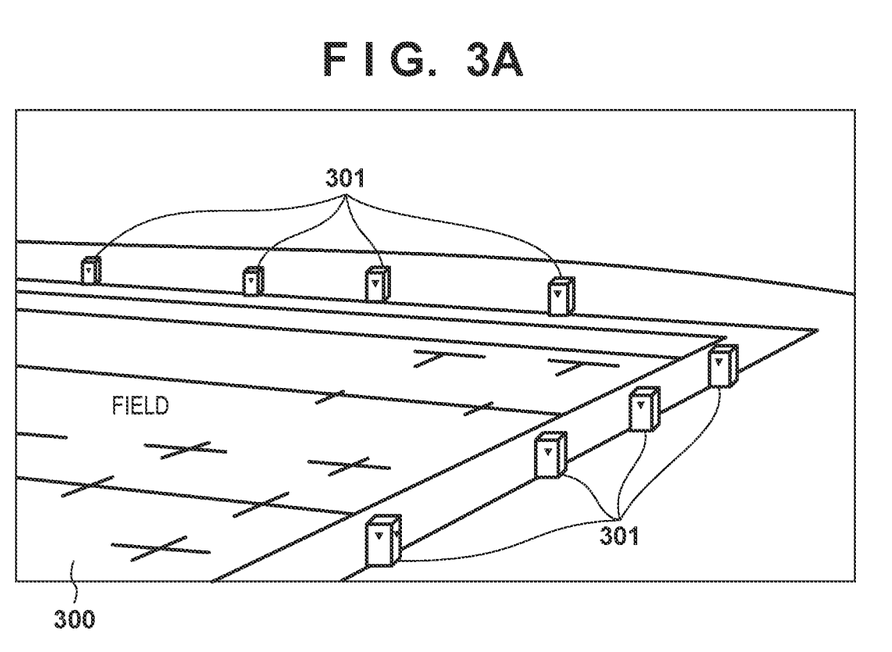
FIG. 3A is a diagram illustrating an example of markers for orientation adjustment disposed in a field.

In the present embodiment, it is assumed that the camera 101 captures an image of a part of a field in a sports stadium as illustrated in FIG. 3A. A plurality of markers 301 for the camera orientation adjustment are disposed around the field as indicators for the camera orientation adjustment. In the present embodiment, the first target image for the first camera orientation adjustment is a CG image created by CG of the part of the field in the stadium illustrated in FIG. 3A.

The PC 102 generates the CG image based on a three-dimensional model of a structure in an image capturing region of the camera 101 that is a target of the orientation adjustment and the target position and orientation of the camera 101. More specifically, for example, a 3D scan is performed inside the stadium in advance to create a three-dimensional model of the stadium. Next, the PC 102 arranges a three-dimensional model of the markers for the camera orientation adjustment on a periphery of a field in the three-dimensional model of the stadium, and reproduces the markers 301 for the camera orientation adjustment and a field 300 illustrated in FIG. 3A by a three-dimensional CG model. When the PC 102 creates the three-dimensional CG model of the field 300 in which the markers 301 are arranged, the PC 102 generates a two-dimensional CG image by simulating a captured image by the camera 101 by using a position, a line-of-sight direction (view direction), and a focal distance (zoom magnification) that are predetermined. The PC 102 uses the two-dimensional CG image generated in this manner as the first target image. Note that the first target image may be generated by an apparatus other than the PC 102 to be saved (stored) in the image server 108, for example, and may be provided to the PC 102 and the image processing apparatus 103 as necessary.

Figure 3B:
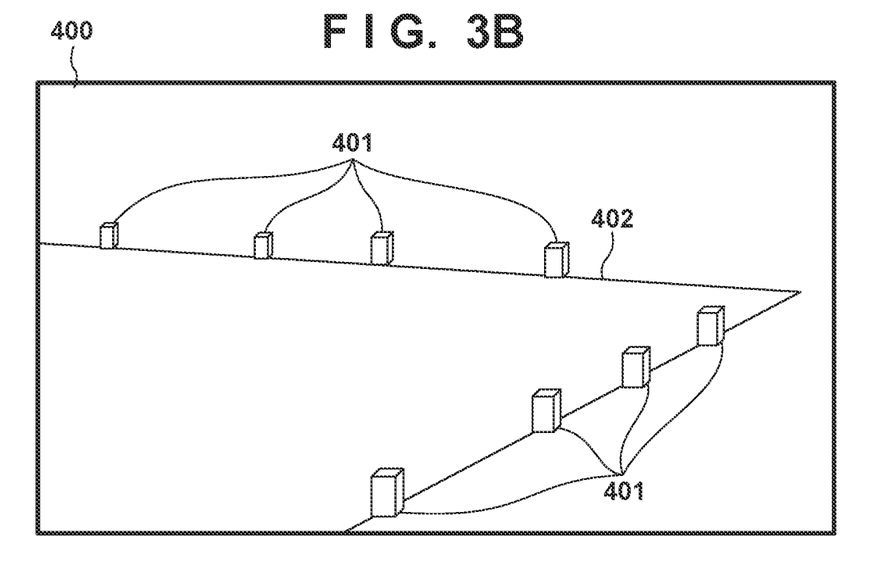
FIG. 3B is a diagram illustrating an example of a first target image for the camera orientation adjustment.

FIG. 3B illustrates an example of a first target image 400 that is used as a target in the first camera orientation adjustment. In the first target image 400 in FIG. 3B, a field boundary 402 and markers 401 for camera orientation adjustment are drawn in order to facilitate the camera orientation adjustment, and other drawings are omitted. In response to the user operation, the PC 102 displays the first target image 400 created as described above on the display. Note that in a case of a configuration in which the first camera orientation adjustment is performed at an edge or the like of the structure detected from the captured image, the markers for the orientation adjustment can be omitted.

Figure 4A:
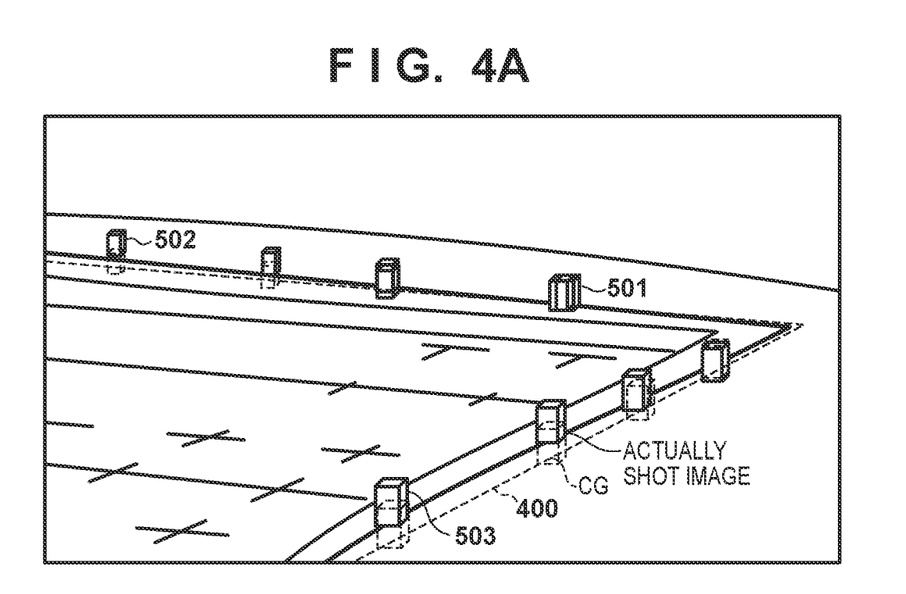
FIG. 4A is a diagram illustrating a display example in first camera orientation adjustment.

In step S202, the PC 102 composites the captured image from the camera 101 connected through the HDMI® cable on the first target image 400 and displays the compositing images on the display. FIG. 4A is a diagram illustrating an example in which the PC 102 composites and displays the first target image 400 and the captured image by the camera 101 on the display. The dotted line in FIG. 4A represents a drawn image of the first target image 400 for the camera orientation adjustment, and the solid line represents a captured image in real time obtained from the camera 101. The user performing an operation of the camera orientation adjustment performs the orientation adjustment of the camera such that the first target image 400 (dotted line) and the captured image in real time (solid line) from the camera 101 coincide with each other.

Figure 4B:
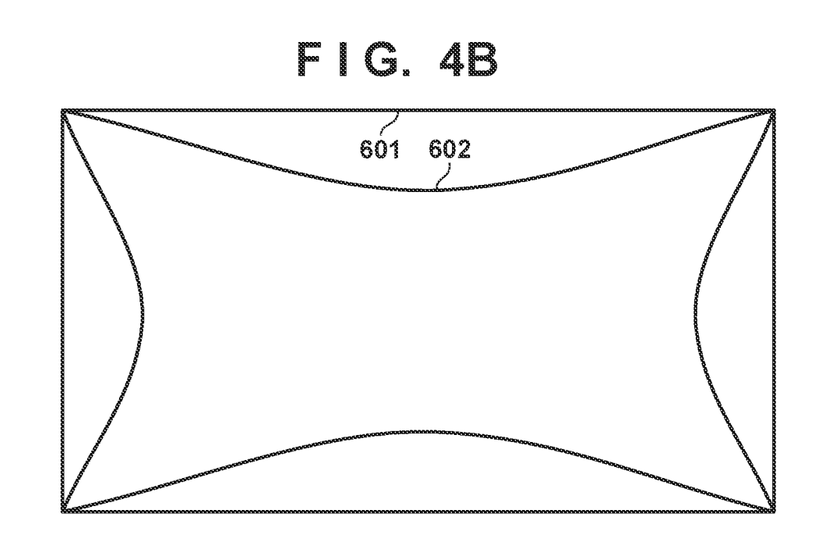
FIG. 4B is a diagram for explaining an example of lens optical properties (pincushion distortion aberration).

Here, it is assumed that the lens of the camera 101 has distortion aberration as illustrated in FIG. 4B. Due to the distortion aberration, a captured image 601 of a rectangular object by using an aplanatic optical system distorts as a captured image 602. In particular, distortion such that a central portion contracts as in FIG. 4B is known as pincushion distortion aberration. Since in such optical aberration, aberration being different depending on respective lenses and being associated with lens assembly tolerance and the like is added to aberration known as lens design specifications, the optical aberration has unique properties that are different depending on the respective lenses. Thus, it is not practical to create the first target image 400 in which the optical aberration is reflected in advance by computer graphics.

Thus, in the first camera orientation adjustment, by causing the operator of the camera orientation adjustment to make determination and allowing coarse adjustment to be performed such that the images substantially coincide with each other, the operation efficiency of the camera orientation adjustment is improved. For example, in FIG. 4A, even in a case where the CG image and the actually captured image do not coincide with each other at the marker 502 and the marker 503 for the camera orientation adjustment in the periphery of the image, the first camera orientation adjustment is determined to be completed when the CG image and the actually captured image substantially coincide with each other at the marker 501 in the central portion of the image.

Steps S203 to S206 are processes to be performed by the image processing apparatus 103. In step S203, after the first camera orientation adjustment (the coarse adjustment of the camera orientation) using the first target image based on the CG image for the camera 101 is completed, the image obtaining unit 104 obtains the captured image obtained when the camera 101 captures an image of the inside of the field. In other words, the image obtaining unit 104 obtains the captured image by the camera 101 after the first camera orientation adjustment. A video signal is constantly sent to the image processing apparatus 103 in real time from the camera 101. The image obtaining unit 104 determines the completion of the coarse adjustment using the first target image by a predetermined trigger to the image processing apparatus 103, and receives one frame of the image sent in real time as a still image.

Figure 5A:
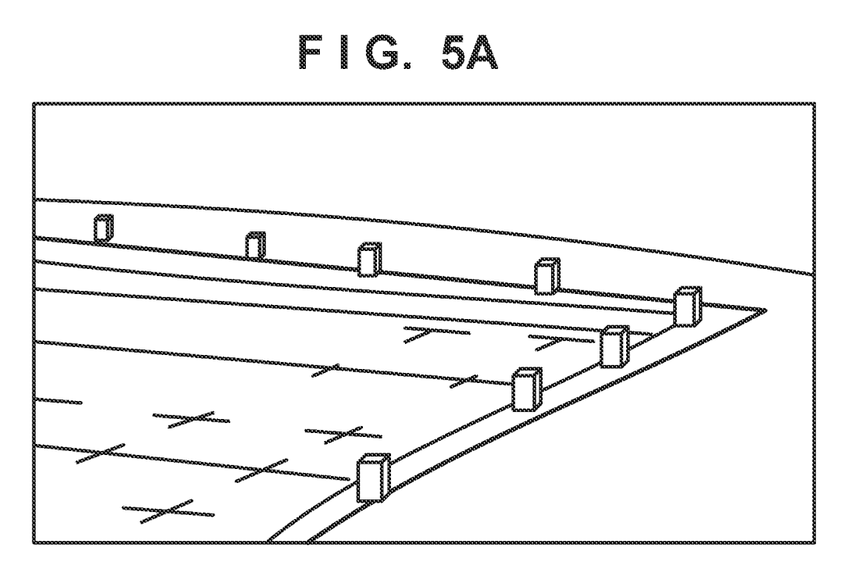
FIG. 5A is a diagram illustrating a captured image after the first camera orientation adjustment.

Note that the PC 102 may automatically determine the completion of the first camera orientation adjustment to notify the image processing apparatus 103 of the trigger, and the PC 102 may notify the image processing apparatus 103 of the trigger in response to a predetermined user operation. Note that various methods can be used for automatic determination of the completion of the coarse adjustment. For example, the PC 102 determines the completion of the coarse adjustment when a degree of coincidence between a position of the marker extracted from the central portion of the first target image and a position of the marker extracted from the central portion of the captured image exceeds a threshold value. FIG. 5A illustrates an example of a still image of one frame obtained by the image obtaining unit 104. Distortion due to distortion aberration is included in the still image (captured image) obtained by the image obtaining unit 104.

Next, in step S204, the correction amount determination unit 105 determines a correction amount for correcting a difference (orientation error) between the current orientation of the camera 101 and the target orientation. That is, the correction amount determination unit 105 calculates the orientation error by using differential analysis between the captured image obtained by the image obtaining unit 104 and the target camera orientation, and calculates the correction amount for the camera orientation for correcting the orientation error as an image correction amount of the captured image after the first camera orientation adjustment.

In the differential analysis between the target camera orientation and the captured image, what to be set as a target, how to define an allowable error, and the like are different depending on the user, and an analytical technique is determined according to the definition. For example, the captured image may be corrected such that an error in the central portion between the first target image (CG image) and the captured image is eliminated in priority to an error in the peripheral portion. That is, the image central portions of the first target image and the captured image may be made to coincide with each other, and an error in the periphery of the image may be allowed. Additionally, for example, the captured image may be corrected such that an error between the first target image (CG image) and the captured image entirely becomes small (for example, such that the error becomes smaller than or equal to a predetermined value or becomes minimum). More specifically, a mean square error at the position of the marker for each of the first target image and the captured image may be calculated and the error may be distributed such that the error becomes small over the entire image. Also, the target image may not be the same as the first target image. For example, an image of only the marker in the first target image, an image of only the edge of the structure, or the like may be applicable. As described above, the correction amount determination unit 105 performs analysis according to a usage case, and calculates and determines the image correction amount by using each correction algorithm.

Figure 5B:
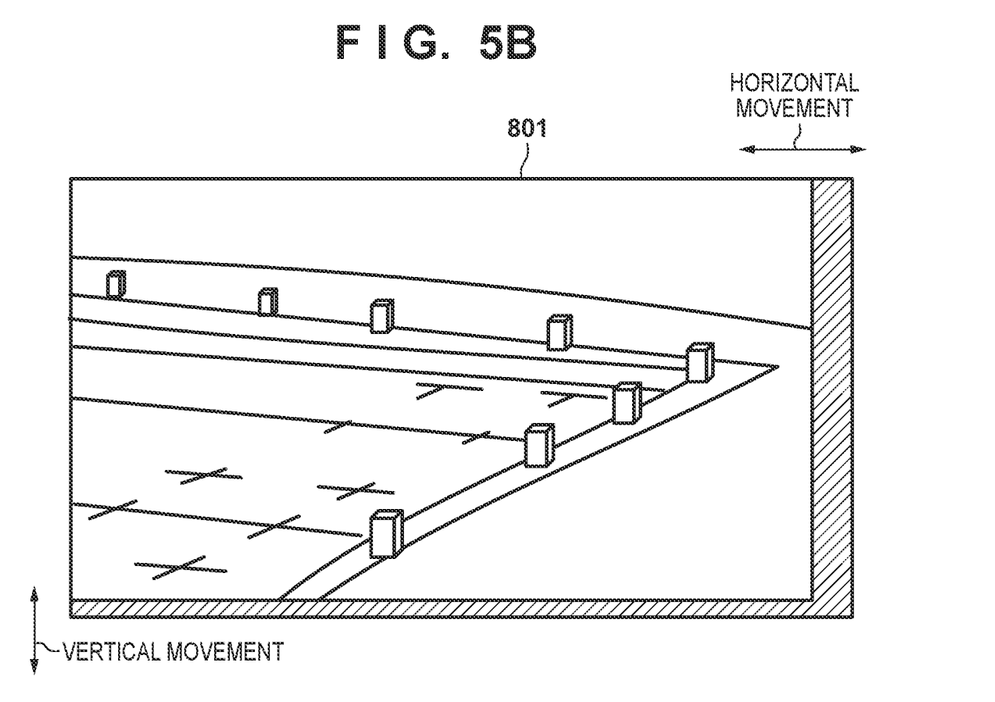
FIG. 5B is a diagram illustrating an example of a second target image for second camera orientation adjustment.

In step S205, the image correction unit 106 corrects the captured image obtained by the image obtaining unit 104 (the captured image after the first camera orientation adjustment) based on the correction amount determined by the correction amount determination unit 105, and generates the second target image for the second camera orientation adjustment. FIG. 5B is a diagram illustrating an example of a second target image 801 obtained when the image correction unit 106 performs correction processing on the captured image after the first camera orientation adjustment based on the correction amount obtained by the correction amount determination unit 105. The second target image 801 is a result obtained by performing translation with respect to the captured image, that is, horizontal movement corresponding to a pan of the camera orientation, and vertical movement corresponding to a tilt of the camera orientation. Note that the correction of the captured image is not limited to the translation such as the pan or tilt of the camera orientation. For example, rotation of the captured image corresponding to rotation of the camera orientation, and magnification (enlargement/reduction processing) of the captured image corresponding to zoom (focal distance adjustment) of the camera orientation may be performed. The second target image 801 obtained by the image correction unit 106 is temporarily recorded in the image recording unit 107.

In step S206, the image processing apparatus 103 transmits the second target image 801 recorded in the image recording unit 107 to the image server 108. The image server 108 is connected to the image processing apparatus 103 and the PC 102 through a network, and they can mutually transfer images. Note that the network is irrespective of wired or wireless.

In step S207, the PC 102 downloads the second target image 801 from the image server 108 in response to a predetermined user operation for performing the camera orientation adjustment, and displays the second target image 801 on the display. At this time, similarly to the case of the first camera orientation adjustment, the PC 102 composites and displays the captured image in real time from the camera 101 and the second target image 801 on the display. The user performing the camera orientation adjustment performs the camera orientation adjustment such that the captured image in real time and the second target image 801 coincide with each other.

Figure 6A:
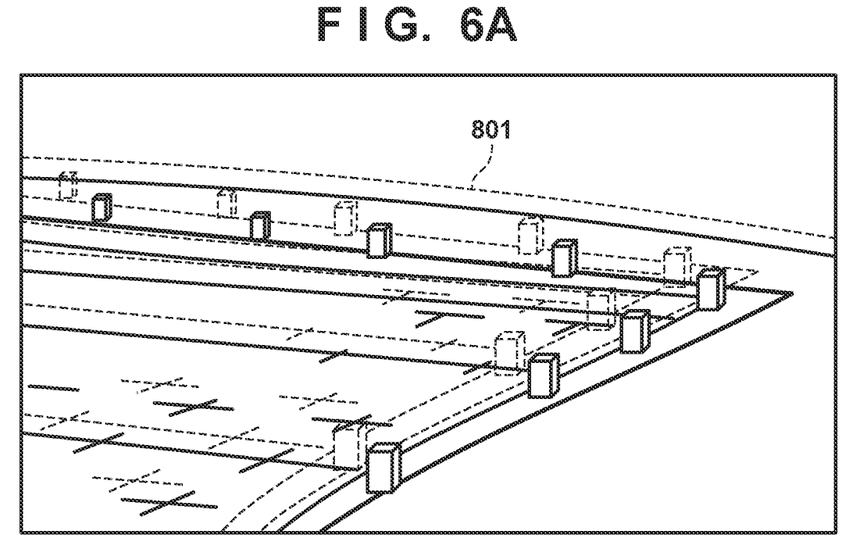
FIG. 6A is a diagram for explaining the second camera orientation adjustment.
Figure 6B:
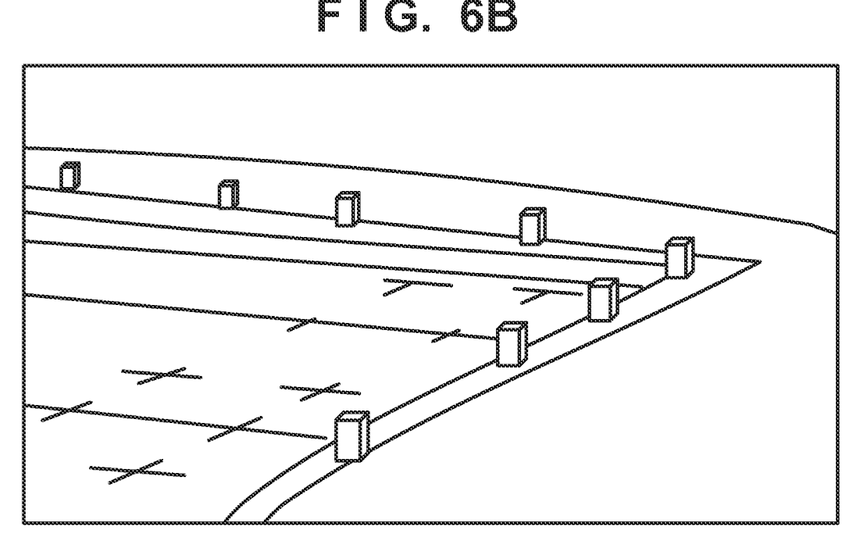
FIG. 6B is a diagram illustrating an example of a captured image after the second camera orientation adjustment.

FIG. 6A is a diagram illustrating the second camera orientation adjustment, and the dotted line represents the second target image 801, and the solid line represents the captured image in real time by the camera 101. The second target image 801 is a target image generated from the captured image by the camera 101. Therefore, as illustrated in FIG. 6B, in the compositing image after the second camera operation adjustment is performed, the captured image and the target image can completely coincide with each other, with optical aberration (distortion aberration) included. As a result, a reduction in accuracy of the orientation adjustment, occurrence of a variation caused by the user who performs the orientation adjustment, a degradation in reproducibility of the orientation adjustment, and the like are prevented.

Second Embodiment

In the first embodiment, an embodiment has been described in which the orientation adjustment is performed for one camera, but in the second embodiment, a configuration will be described in which the orientation adjustment is performed for a plurality of cameras.

Figure 7:
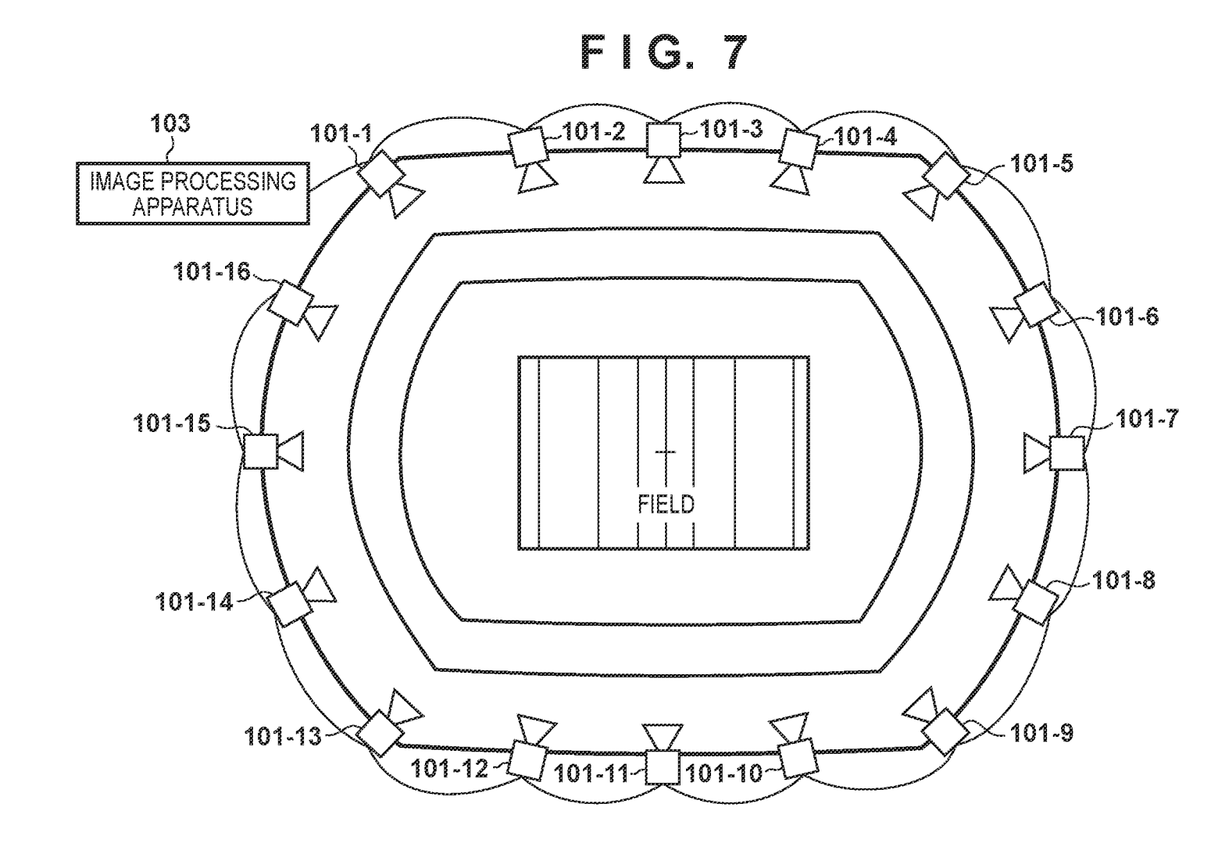
FIG. 7 is a diagram illustrating an arrangement example of a plurality of cameras according to a second embodiment.
Figure 8:
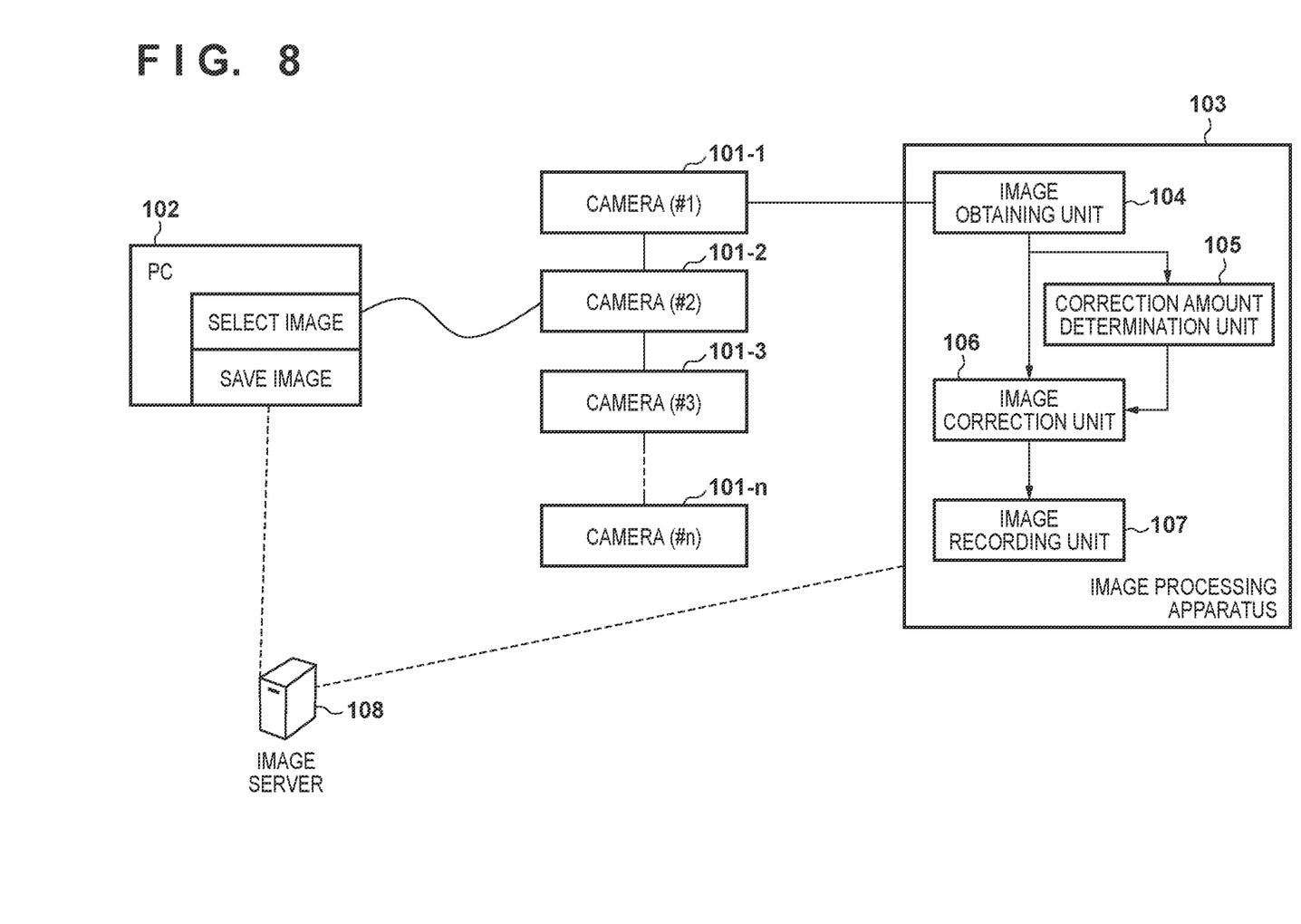
FIG. 8 is a diagram illustrating a configuration example of an orientation adjustment system according to the second embodiment.

FIG. 7 is a diagram illustrating an arrangement example of a plurality of cameras. In FIG. 7, a plurality of (16) cameras 101-1 to 16 are illustrated in a state of being arranged along a periphery of a stadium so as to surround a field. The plurality of respective cameras are connected to each other via a network, and can transfer their captured images to the image processing apparatus 103. FIG. 8 is a diagram illustrating a configuration example of an orientation adjustment system according to the second embodiment. When the 16 cameras are arranged as illustrated in FIG. 7, n=16 is satisfied in FIG. 8. In the second embodiment, the first camera orientation adjustment and the second camera orientation adjustment are also performed. Similarly to the first embodiment, prior to the start of the camera orientation adjustment, n first target images for the first camera orientation adjustment corresponding to the respective cameras 101-1 to n are created and saved in the PC 102.

In the first camera orientation adjustment, the PC 102 selects, from among the n first target images saved in the PC 102, the first target image corresponding to the camera being a target of the orientation adjustment, and displays the selected first target image on the display. FIG. 8 illustrates a case in which the orientation adjustment of the camera 101-2 (camera (#2)) is performed among the plurality of cameras 101-1 to 101-n. In other words, the PC 102 is connected to the camera 101-2, and composites and displays the first target image corresponding to the camera 101-2 and a captured image in real time from the camera 101-2 on the display. A user performs the first camera orientation adjustment for the camera 101-2 based on the compositing display.

When the first camera orientation adjustment for the camera 101-2 is completed, the camera 101-2 obtains the captured image after the first camera orientation adjustment. The captured image after the first camera orientation adjustment is transferred to the image processing apparatus 103 via a network. The captured image by the camera 101-2 that has been transferred to the image processing apparatus 103 is received by the image obtaining unit 104, and is processed similarly to the first embodiment (S202 to S206 in FIG. 2). In other words, the correction amount determination unit 105 analyzes a difference from the target camera orientation to determine the image correction amount, the image correction unit 106 generates the second target image according to the obtained captured image and the image correction amount, and the image recording unit 107 records the second target image.

Here, in the second embodiment, a camera number (identification information) is included in a image file name so as to be able to identify which camera has captured the image among the n (=16) cameras and which camera corresponds to the second target image. The second target image 801 recorded in the image recording unit 107 is transmitted to the image server 108. In response to the predetermined user operation for performing the camera orientation adjustment, the PC 102 causes the second target image 801 corresponding to, for example, the camera 101-2 to be transferred (downloaded) from the image server 108. The PC 102 composites and displays the second target image 801 and a captured image in real time from the corresponding camera (camera 101-2 in this example) on the display. By using this displayed image, the user performs the second camera orientation adjustment for the camera 101-2.

Note that, in a case where the identification information for identifying the camera that has captured the captured image after the first camera orientation adjustment can be applied to an image file (or a file name), the first camera orientation adjustment for the next camera can be started without waiting for the completion of generating the second target image. In this case, the first camera orientation adjustment may be sequentially performed on the n (16 in the present example) cameras, and the image processing apparatus 103 may collectively generate the second target images by using the image file names each of which includes the identification information of the camera. After the PC 102 sequentially performs the first camera orientation adjustment for the plurality of cameras, the PC 102 can sequentially perform the second camera orientation adjustment for the plurality of cameras. Note that associating the camera with the image has been performed by including the camera number (identification information) in the image file name in the above description, but the present disclosure is not limited thereto. Any method may be used as long as the camera can be associated with the image.

Third Embodiment

Figure 9:
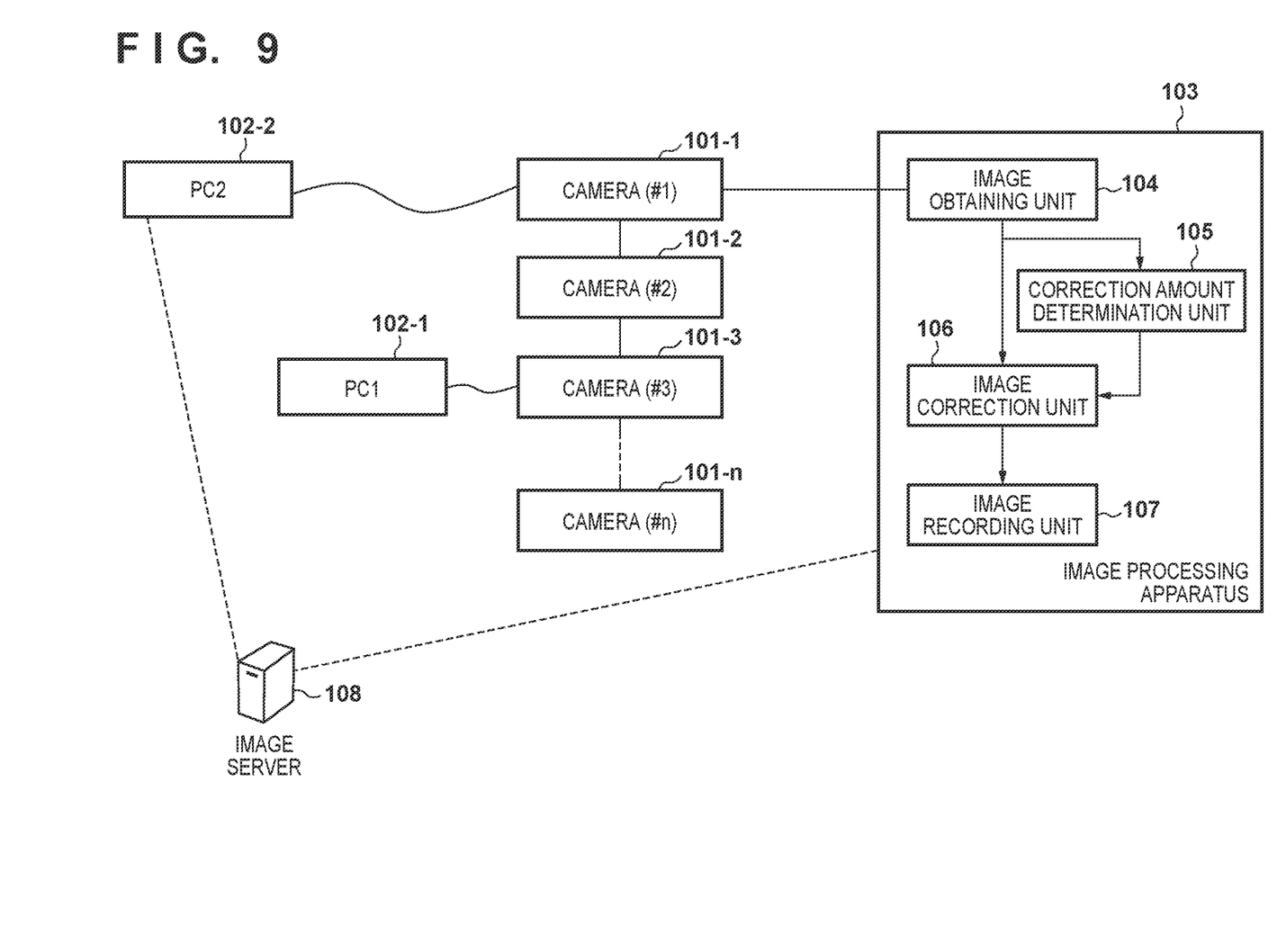
FIG. 9 is a diagram illustrating a configuration example of an orientation adjustment system according to a third embodiment.

In the first embodiment and the second embodiment, the orientation adjustment system using only one PC 102 has been described. In the third embodiment, a configuration using a plurality of PCs will be described. FIG. 9 is a diagram illustrating a configuration example of an orientation adjustment system according to the third embodiment. In the example of FIG. 9, the configuration is illustrated in which a plurality of (two) PCs 102 are used to perform the orientation adjustment for a plurality of (n) cameras. Note that the number of PCs 102 is not limited to two, and may be equal to or more than three.

In a case of the configuration illustrated in FIG. 9, when different users use the respective PC 102-1 and PC 102-2 to perform the orientation adjustment of the cameras, the orientation adjustment for the plurality of cameras can be performed substantially in parallel. Alternatively, one of the PCs may be used for the first orientation adjustment, and the other of the PCs may be used for the second orientation adjustment. In this case, for example, the PC 102-1 records a plurality of first target images (CG images) that have been previously generated for the plurality of respective cameras, and sequentially performs the first camera orientation adjustment. From the camera in which the first camera orientation adjustment has been completed, the captured image after the first camera orientation adjustment is transmitted to the image processing apparatus 103. The image processing apparatus 103 creates the second target image by using the captured image from the camera in which the first camera orientation adjustment has been completed, and saves the generated second target image in the image server 108. On the other hand, the PC 102-2 downloads the second target image from the image server 108 for the camera in which the first camera orientation adjustment has been completed by the PC 102-1, and performs the second camera orientation adjustment.

As described above, according to the above-described respective embodiments, the PC 102-1 (102-2) assists the camera orientation adjustment by compositing and displaying the target image serving as an indicator of the camera orientation adjustment and the captured image from the camera to be adjusted. Here, the first camera orientation adjustment is performed by using the predetermined first target image, then the second target image is generated based on the captured image after the first camera orientation adjustment, and thus a target image including optical aberration specific to each of the camera lenses is generated. As a result, in the camera orientation adjustment by compositing the second target image and the captured image, adjustment that causes the target image and the captured image to coincide with each other over the entire captured image can be performed. As a result, regardless of the subjective view of a user who performs the camera orientation adjustment, it is possible to stably perform the camera orientation adjustment with high accuracy. In this way, the degradation in accuracy of the camera orientation adjustment due to the misalignment between the target image and the captured image caused by the image capturing optical properties is improved.

Since the camera has unique optical properties (optical aberration) specific to the lens, an image to be captured obtained by computer simulation (CG image) and an actually captured image obtained from the camera are different. Therefore, even when the camera orientation adjustment is performed so as to composite the captured image and the CG image with the CG image serving as the target image, the captured image from the camera does not coincide with the CG image, and the accuracy of the camera orientation adjustment is low, and has a variation. According to the above-described embodiments, such a variation in accuracy of adjustment is reduced, and the orientation adjustment of the image capturing apparatus can be performed with high accuracy.

OTHER EMBODIMENTS

Embodiment(s) of the present disclosure can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present disclosure has been described with reference to exemplary embodiments, it is to be understood that the disclosure is not limited to the disclosed exemplary embodiments. The scope of the following claims is to be accorded the broadest interpretation so as to encompass all such modifications and equivalent structures and functions.

This application claims the benefit of Japanese Patent Application No. 2020-039923, filed Mar. 9, 2020, which is hereby incorporated by reference herein in its entirety.

What is claimed is:

1. An image processing apparatus comprising:
one or more memories configured to store instructions; and one or more processors configured to execute the instructions to:
> obtain a captured image captured by an image capturing apparatus and a first target image generated based on a three-dimensional model of a structure in an image capturing region;
>
> determine a correction amount for correcting a difference between an orientation of the image capturing apparatus and a target orientation based on the difference between the first target image and the obtained captured image; and
>
> generate a second target image by correcting the obtained captured image by using the correction amount.

2. The apparatus according to claim 1, wherein
the second target image is generated by translating, rotating, or magnifying the obtained captured image, based on the correction amount.

3. The apparatus according to claim 1, wherein
the difference between the first target image and the obtained captured image is determined based on an image of a marker included in the first target image and the obtained captured image or a structure included in the first target image and the obtained captured image.

4. The apparatus according to claim 3, wherein
the first target image is an image generated based on the three-dimensional model of the structure in the image capturing region and a target position and orientation of the image capturing apparatus.

5. The apparatus according to claim 1, wherein
the correction amount is determined such that a difference in a central portion between the first target image and the captured image is eliminated in priority to a difference in a peripheral portion.

6. The apparatus according to claim 1, wherein
the correction amount is determined such that a difference between the first target image and the captured image becomes small due to error distribution.

7. The apparatus according to claim 1, wherein
the one or more memories store the second target image.

8. The apparatus according to claim 7, wherein the one or more processors further execute the instructions to cause a display device to perform a first display for displaying the first target image and the captured image obtained from the image capturing apparatus, and a second display for displaying the second target image and the captured image obtained from the image capturing apparatus.

9. The apparatus according to claim 7, wherein
identification information for identifying the image capturing apparatus is applied to the obtained captured image, and
the identification information is applied to the second target image.

10. An image processing method comprising:
obtaining a captured image captured by an image capturing apparatus and a first target image generated based on a three-dimensional model of a structure in an image capturing region;
determining a correction amount for correcting a difference between an orientation of the image capturing apparatus and a target orientation based on the difference between the first target image and the obtained captured image; and
generating a second target image by correcting the obtained captured image by using the correction amount.

11. An orientation adjustment system comprising:
one or more memories configured to store instructions; and
one or more processors configured to execute the instructions to:
> obtain a first target image generated based on a three-dimensional model of a structure in an image capturing region;
>
> cause a display device to display an image for adjusting an orientation of an image capturing apparatus by using the first target image;
>
> obtain a captured image captured by the image capturing apparatus after an orientation adjustment is performed by using the displayed image;
>
> generate a second target image by correcting the obtained captured image by using a correction amount for correcting a difference between the orientation of the image capturing apparatus and a target orientation, the correction amount being determined based on the difference between the first target image and the obtained captured image; and
>
> cause the display device to display an image for further adjusting the orientation of the image capturing apparatus by using the second target image.

12. The system according to claim 11, wherein
a compositing image of the first target image and a captured image from the image capturing apparatus is displayed.

13. The system according to claim 11, wherein
the first target image is generated by generating a computer graphics image corresponding to the target orientation of the image capturing apparatus based on the three-dimensional model.

14. The system according to claim 11, wherein
the correction amount includes translation, rotation, or magnification of the captured image.

15. The system according to claim 11, wherein
the correction amount is determined such that a difference in a central portion between the first target image and the captured image is eliminated in priority to a difference in a peripheral portion.

16. The system according to claim 11, wherein
the correction amount is determined such that a difference between the first target image and the captured image becomes small due to error distribution.

17. The system according to claim 11, wherein
a compositing image of the second target image and a captured image from the image capturing apparatus is displayed on the display device.

18. A non-transitory computer-readable medium storing a program for causing a computer to perform an image processing method comprising:
obtaining a captured image captured by an image capturing apparatus and a first target image generated based on a three-dimensional model of a structure in an image capturing region;
determining a correction amount for correcting a difference between an orientation of the image capturing apparatus and a target orientation based on the difference between the first target image and the obtained captured image; and
generating a second target image by correcting the obtained captured image by using the correction amount.

* * * * *